J. H. HAMMOND, Jr.
SYSTEM FOR CONTROLLING MOVING BODIES BY RADIO ENERGY.
APPLICATION FILED JULY 24, 1913. RENEWED JAN. 24, 1921.

1,390,288.

Patented Sept. 13, 1921.

Witnesses:
Horace A. Crossman
Carl L. Choate.

Inventor:
John Hays Hammond, Jr.
by Emery, Booth, Janney and Varney
Attys.

UNITED STATES PATENT OFFICE.

JOHN HAYS HAMMOND, JR., OF GLOUCESTER, MASSACHUSETTS.

SYSTEM FOR CONTROLLING MOVING BODIES BY RADIO ENERGY.

1,390,288.  Specification of Letters Patent.  Patented Sept. 13, 1921.

Application filed July 24, 1913, Serial No. 780,887. Renewed January 24, 1921. Serial No. 439,688.

*To all whom it may concern:*

Be it known that I, JOHN HAYS HAMMOND, Jr., a citizen of the United States, and a resident of Gloucester, in the county of Essex and State of Massachusetts, have invented an Improvement in Systems for Controlling Moving Bodies by Radio Energy, of which the following description, in connection with the accompanying drawings, is a specification, like characters on the drawings representing like parts.

This invention relates to the control of moving bodies at a distance by radio energy.

In order that the principle of the invention may be readily understood, I have disclosed a single embodiment thereof in the accompanying drawing, wherein—

The object of my invention is to provide improved means to control moving bodies at a distance by radiant energy, such, for example, as vessels or vehicles, and particularly torpedoes. It has heretofore been proposed to effect the control of torpedoes at a distance by employing means to generate at a control station electromagnetic or Hertzian waves having different characteristics, and to employ such differently characterized waves to energize elements upon the torpedo, such elements being syntonized to the frequencies characteristic of the said waves, so as to effect the functioning of mechanisms upon the torpedo independently of each other, as shown for example in the U. S. patent to Fiske, No. 660,155, and U. S. patent to Wilson, No. 719,405.

By my invention I have overcome inherent limitations existing in the prior art, and have in practical operation secured a great accuracy of control.

Figure 1:
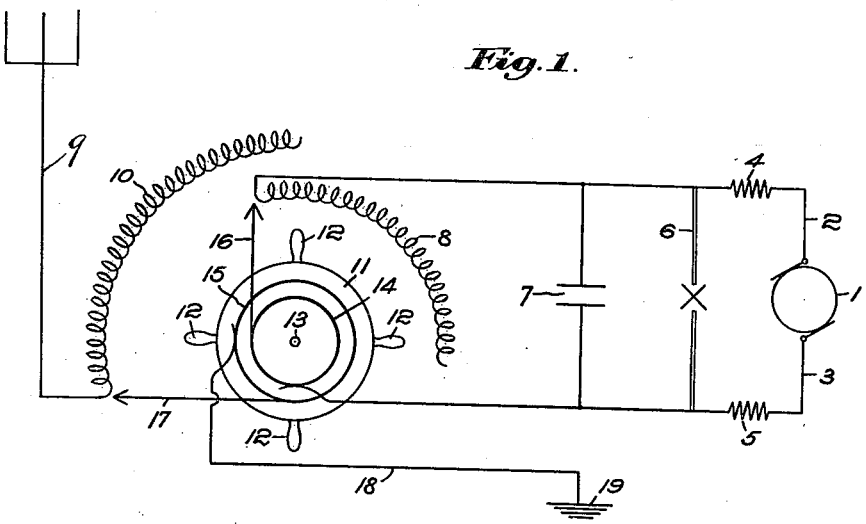
Figure 1 is a diagrammatic representation of a control station.

Referring more particularly to the drawings, wherein I have diagrammatically indicated one embodiment of the invention, I have in Fig. 1, shown a control station. While within the scope of my invention I may employ any suitable generator, I have herein represented at 1 a direct current generator which may be of any suitable voltage. In practice, I have found a generator of about five hundred volts to be productive of excellent results. Leading from the generator are wires 2, 3 provided with suitable choke coils 4, 5, to prevent the high tension, high frequency oscillating currents from reaching and injuring the generator. I have represented a suitable resistance, here taking the form of an arc 6 having for its terminal points copper and carbon or other suitable materials. At 7, I have indicated a suitable condenser, the capacity whereof is suited to the electrical constants of the circuit about which it is shunted. I have indicated a primary inductance at 8, this being connected at one end to the wire 2. The position of the inductance coil 8 is such as to allow transference of energy from the closed circuit in which it is positioned to the open aerial circuit 9 which may be of any suitable type, and which is provided with a secondary inductance 10.

I provide suitable means to vary the value of the inductances in both the closed and the open circuits and to vary them in a predetermined ratio, so as to keep the value of the electrical constants in both circuits so related as to maintain electrical syntony between the circuits. While for this purpose I may use any suitable means, I have herein represented a rotary or oscillatory member or wheel 11 having spokes or handles 12 and mounted upon any suitable axis 13. The said rotary member or wheel is provided with two conducting metallic segments or rings 14 and 15, insulated from each other. The wire 3 of the closed, oscillatory circuit is in contact with the ring or segment 14 throughout the movement of the member 11, and from said ring or segment extends a wire 16 adapted by the rotation of the said member to be moved along and to contact with the primary inductance 8 at any point along its length, so as to increase or diminish the inductance of the said closed, oscillatory circuit.

Extending from the ring or segment 15 is a wire 17 adapted to be moved along and to contact with the secondary inductance 10 at any point, so as to increase or decrease the inductance of the open, aerial circuit, and bearing upon said ring or segment 15 throughout the movement of the member 11 is a wire 18 leading to earth, as indicated at 19.

As the rotary member or wheel 11 is rotated or turned in a clockwise direction, viewing Fig. 1, more inductance will be added to both the closed circuit and to the open, radiating circuit, thus lowering the frequency of oscillation of said circuits with the result of increasing the emitted wave length. Movement of the wheel or member 11 in a contraclockwise direction will in a reverse manner shorten the wave length by taking out inductance from the circuit.

Upon the vessel or moving body to which I shall hereafter refer generically as a torpedo, the receiving elements are arranged to cause the torpedo to turn to the right when the wheel 11 is turned to the right—that is, in a clockwise direction, and to turn to the left when the said wheel is turned to the left—that is, in a contraclockwise direction. In this manner, I obtain an exceedingly simple and yet effective method of control.

Figure 2:
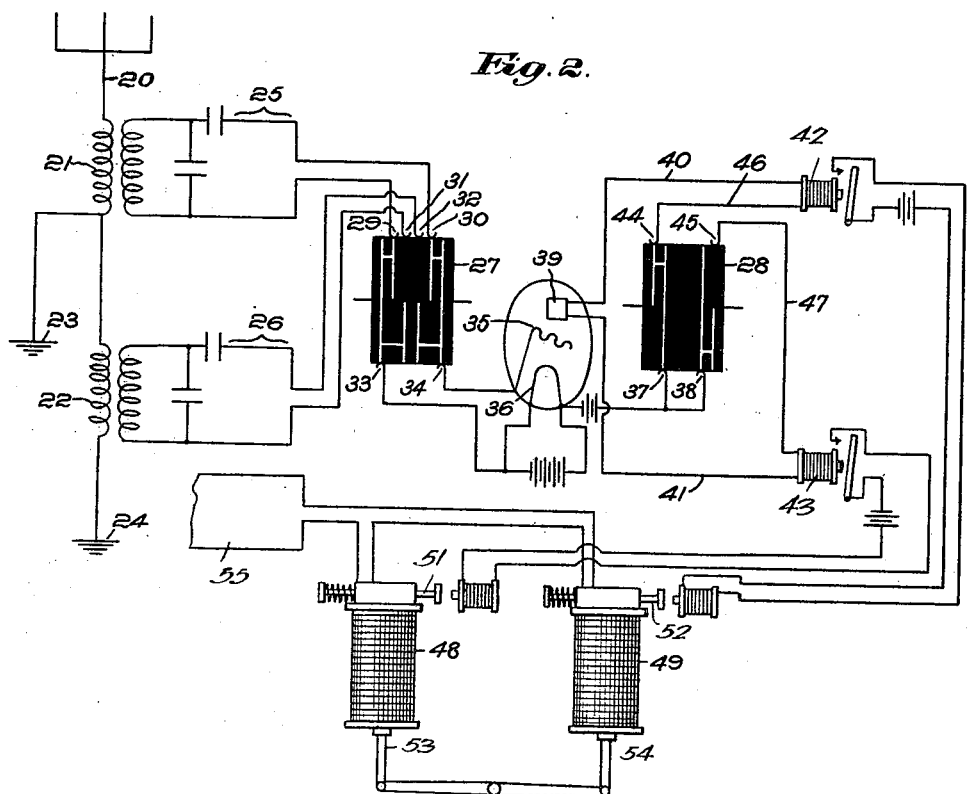
Fig. 2 is a diagrammatic representation of the receiving circuits and mechanisms operated thereby upon the moving body.

In Fig. 2, I have represented the receiving circuits. Therein I have represented the receiving antenna at 20, it being provided with two primary windings 21 and 22 and two ground connections 23, 24. In suitable relation respectively to the primary windings 21 and 22, I position receiving circuits 25, 26 which are respectively tuned to two different wave characteristics that may be transmitted from the control station typified in Fig. 1. The said circuits 25 and 26 may be of any suitable character, but intermittently co-acting or connected therewith I provide a single detector and suitable means, such, for example, as one or more commutators so as intermittently and preferably automatically to connect said detector first with one of said circuits 25, 26, and then with the other. I also preferably provide, in this embodiment of my invention, two relay circuits, which are connected to mechanisms to be controlled, as, for example, to the rudder, and provide means such as a commutator for connecting first one relay circuit and then the other to said detector at the times when the circuits 25 and 26 are respectively connected to the detector, whereby when one oscillatory receiving circuit is connected to the detector, the corresponding relay circuit is connected thereto, and when the other oscillatory circuit is connected to the detector, its relay circuit is likewise connected to the detector.

While I may accomplish the desired result in any suitable manner, I have herein represented two commutators 27, 28, which are mounted upon the same shaft, so as to rotate in unison. The commutator 27 is provided with suitable rings and segments, one type of which I have diagrammatically indicated to permit the completion of the circuit through either the brushes 29, 30 of the oscillatory circuit 25 or the brushes 31, 32 of the oscillatory circuit 26. In constant contact with rings upon the commutator 27 are brushes 33, 34, from which lead wires extending to some suitable detector. I have herein represented an audion, well known in the art and which I need not fully describe.

The brush 34 is connected by wiring to the grid 35 of the audion, and the brush 33 to the filament 36 thereof and from the filament 36 leads a wire terminating in brushes 37, 38 making constant contact with rings upon the commutator 28.

From the metal plate 39 of the audion lead wires 40, 41, the former of which is connected to the relay 42 and the latter of which is connected to the relay 43. Adapted to contact with suitable segments upon the commutator 28 are also brushes 44, 45, the wires 46, 47 whereof lead respectively to the relays 42 and 43.

The relays 42, 43 are in circuit, as represented, with suitable elements controlling the torpedo, and herein typified as piston cylinders 48, 49, which are operatively connected to the rudder indicated at 50. The said relays 42 and 43 control electric valves 51 and 52 which allow gas under pressure from a tank or source 55 to operate the pistons 53 and 54, thereby to control the position of the rudder.

By providing circuit breaking means herein typified by the commutators 27, 28, I obtain certain very important results. The necessity of employing more than a single detector is dispensed with. Again, by temporarily cutting out the detector from the said oscillatory circuits, I permit the resonance of said circuits to become a maximum, inasmuch as I have in the manner described removed from the circuits a large ohmic resistance and a source of considerable absorption of power. In the case of certain detectors, as, for example, those of the crystal type, this is a matter of prime importance.

On account of the relatively high speed at which the commutators 27, 28 are driven, either circuit 25, 26 may be considered to be at all times in a receptive condition. Therefore, by turning the rotary member 11 at the control station toward the right or toward the left, it is possible to change the wave length, and thereby to cause the proper operation of the torpedo, and, in that embodiment of my invention herein represented, by the functioning of either of the relays 42, 43 and the piston cylinders 48, 49 connected to the rudder 50. It is, however, to be understood that the piston cylinders 48, 49 are typical merely of devices or mechanisms to be controlled, and that any or all functioning parts upon the torpedo may be controlled in accordance with my invention.

Each of the oscillatory receiving circuits 25, 26, is at all times in a receptive condition, being responsive to the power wave length emitted from the control station. I secure this result with the use of a single detector which is intermittently and, in this embodiment of my invention, automatically connected alternately to the said two circuits, and when it is connected to either of said circuits, it is at the same instant of time also connected to the proper relay circuit to effect, upon the emission of the proper wave length, the functioning of the desired mechanism upon the vessel.

Obviously the principle of my invention may be extended within the scope thereof to any desired plurality of receiving circuits. In this disclosed embodiment of the invention, I have represented merely two such receiving circuits.

Having thus described one illustrative embodiment of my invention, I desire it to be understood that although specific terms are employed, they are used in a generic and descriptive sense and not for purposes of limitation, the scope of the invention being set forth in the following claims.

Claims.

1. A receiving station having a plurality of circuits respectively responding to different wave frequencies, a detector, means intermittently and automatically to connect said detector to any one of said receiving circuits, a plurality of subsidiary mechanisms, and means intermittently and automatically to connect said detector to any one of said subsidiary mechanisms.

2. A receiving station having a plurality of circuits respectively responding to different wave frequencies, a detector, means intermittently and automatically to connect said detector to each of said receiving circuits in alternation, a plurality of subsidiary mechanisms, and means intermittently and automatically to connect said detector to each of said subsidiary mechanisms in alternation.

3. A system for the radio control of a vessel including, in combination, a plurality of subsidiary mechanisms upon said vessel functioning in the control thereof, a corresponding plurality of receiving circuits upon the vessel respectively responding to different wave frequencies, a detector, and a pair of commutators rotating in unison to connect each of said receiving circuits intermittently through said detector to the corresponding subsidiary mechanism.

4. A system for the radio control of a vessel including, in combination, a vessel having a rudder, a pair of subsidiary mechanisms operatively connected to the rudder to turn the same in opposite directions, a plurality of receiving circuits upon the vessel respectively responding to different wave frequencies, a detector and means intermittently to connect said detector to each of said receiving circuits in alternation and to the respective subsidiary mechanisms.

5. Means for receiving radiant energy, comprising a plurality of circuits tuned to respond to different frequencies of radiant energy respectively, a detector, a commutator automatically operative to connect said detector successively to said circuits to be controlled thereby, a plurality of operative devices, and means synchronized with said commutator for connecting said devices successively to said detector to cause said devices to be controlled respectively by said circuits.

6. Means for receiving radiant energy, comprising a plurality of elements tuned to respond to different frequencies of radiant energy respectively, a detector, means automatically movable to connect said detector successively to said elements to cause said detector to be controlled successively thereby, a plurality of operative devices and means synchronized with said second mentioned means for connecting said devices successively with said detector to cause said devices to be controlled respectively by said elements.

7. A system for receiving radiant energy, comprising a plurality of elements tuned to respond to different frequencies of radiant energy respectively, a detector, means automatically operative to connect said dectector operatively to said elements successively, a plurality of operative devices, and means synchronized with said first mentioned means for connecting said devices successively to said detector in such a manner as to cause said devices to be controlled successively by said elements.

8. A system of radio control, comprising a plurality of elements tuned to oscillate in different frequencies respectively, a detector, means automatically operative to connect said detector successively with said elements, a plurality of operative devices, and means synchronized with said first mentioned means for connecting said devices successively with said detector.

9. A receiving system for periodic impulses comprising a plurality of elements tuned to respond respectively to a plurality of series of periodic impulses of different frequencies respectively and arranged to respond simultaneously to said plurality of series of impulses, a detector controlled by said elements, and a plurality of devices arranged to be controlled by said elements respectively acting through said detector.

10. A receiving system for periodic impulses comprising a plurality of elements tuned to respond respectively to a plurality of series of periodic impulses of different frequencies respectively, said elements being arranged to respond simultaneously to said plurality of series of impulses, a detector, and means operative to connect said detector successively with said elements to cause said detector to be controlled thereby, and a plurality of devices arranged to be controlled by said elements respectively through the action of said detector.

11. A receiving system for periodic impulses comprising a plurality of elements tuned to respond respectively to a corresponding plurality of series of periodic impulses of different frequencies respectively and arranged to respond to said plurality of series of impulses simulatneously, and a detector controlled by said elements.

12. A receiving system for periodic impulses comprising a plurality of elements tuned to respond respectively to a corresponding plurality of series of periodic impulses of different frequencies respectively and arranged to respond to said plurality of series of impulses simultaneously, and a rectifier controlled by said elements.

13. A receiving system for periodic impulses comprising a plurality of elements tuned to respond respectively to a corresponding plurality of series of periodic impulses of different frequencies respectively and arranged to respond to said plurality of series of impulses simultaneously, and a detector arranged to be successively controlled by said elements respectively.

14. A receiving system for periodic impulses comprising a plurality of elements tuned to respond respectively to a corresponding plurality of series of periodic impulses of different frequencies respectively and arranged to respond to said plurality of series of impulses simultaneously, and a rectifier arranged to be successively controlled by said elements respectively.

15. Means for receiving periodic impulses comprising a plurality of elements tuned to respond to a corresponding plurality of series of impulses of different frequencies respectively, a detector, and means movable to cause said detector to be successively controlled by said elements, and a plurality of devices, and means for operatively connecting said devices with said detector to cause said devices to be controlled respectively by said elements.

16. Means for receiving periodic impulses comprising a plurality of elements tuned to respond to a corresponding plurality of series of impulses of different frequencies respectively, a detector, and means movable to cause said detector to be successively controlled by said elements, and a plurality of devices, and means synchronized with said second mentioned means for operatively connecting said devices with said detector to cause said devices to be controlled respectively by said elements.

17. Means for receiving periodic impulses comprising a plurality of elements tuned to respond to a corresponding plurality of series of impulses of different frequencies respectively, a rectifier, and means movable to cause said rectifier to be successively controlled by said elements, and a plurality of devices, and means for operatively connecting said devices with said rectifier to cause said devices to be controlled respectively by said elements.

18. Means for receiving periodic impulses comprising a plurality of elements tuned to respond to a corresponding plurality of series of impulses of different frequencies respectively, a rectifier, and means movable to cause said rectifier to be successively controlled by said elements, and a plurality of devices, and means synchronized with said second mentioned means for operatively connecting said devices with said rectifier to cause said devices to be controlled by said elements.

In testimony whereof I have signed my name to this specification, in the presence of two subscribing witnesses.

JOHN HAYS HAMMOND, Jr.

Witnesses:
  IRVING U. TOWNSEND,
  ROBERT H. KAMMLER.